US011697957B2

(12) United States Patent
Holzapfel et al.

(10) Patent No.: US 11,697,957 B2
(45) Date of Patent: Jul. 11, 2023

(54) FURNITURE DRIVE

(71) Applicant: Julius Blum GmbH, Hoechst (AT)

(72) Inventors: Andreas Holzapfel, Bregenz (AT); Philip Schluge, Dornbirn (AT)

(73) Assignee: JULIUS BLUM GMBH, Hoechst (AT)

(*) Notice: Subject to any disclaimer, the term of this patent is extended or adjusted under 35 U.S.C. 154(b) by 150 days.

(21) Appl. No.: 17/323,426

(22) Filed: May 18, 2021

(65) Prior Publication Data
US 2021/0270070 A1    Sep. 2, 2021

Related U.S. Application Data

(63) Continuation of application No. PCT/AT2019/060385, filed on Nov. 13, 2019.

(30) Foreign Application Priority Data

Dec. 20, 2018    (AT) ................ A 51144/2018

(51) Int. Cl.
*E05F 1/08*    (2006.01)
*E05F 1/10*    (2006.01)
(Continued)

(52) U.S. Cl.
CPC .............. *E05F 1/1058* (2013.01); *E05D 3/12* (2013.01); *E05D 15/401* (2013.01);
(Continued)

(58) Field of Classification Search
CPC ..... E05F 1/1276; E05F 1/1246; E05F 1/1253; E05F 1/1261; E05F 1/1058; E05F 1/1075;
(Continued)

(56) References Cited

U.S. PATENT DOCUMENTS 4,408,923 A * 10/1983 Kubler ................ F16B 12/2063
403/231
5,906,453 A * 5/1999 Grieser ............... F16B 12/2036
403/409.1
(Continued)

FOREIGN PATENT DOCUMENTS

CN    101680664    3/2010
CN    107268923    10/2017
(Continued)

OTHER PUBLICATIONS

Search Report dated May 10, 2022 in corresponding Chinese Patent Application No. 201980083537.X.
(Continued)

*Primary Examiner* — Chuck Y Mah
(74) *Attorney, Agent, or Firm* — Wenderoth, Lind & Ponack, L.L.P.

(57) ABSTRACT

A furniture drive for moving a furniture part movably-supported relative to a furniture carcass includes a carrier configured to be fixed within or to a sidewall of the furniture carcass, and the carrier has a front face and a longitudinal side protruding substantially at a right angle from the front face. A pivotally supported actuating arm is provided for moving the movable furniture part, and fastening device can fasten a furniture panel of the furniture carcass. The furniture panel extends substantially horizontally in a mounted position, and a fastening device includes a movably-supported locking element for fastening the furniture panel. The locking element is configured to be accessible for a manual or for a tool-assisted actuation from a longitudinal side of the carrier, and the longitudinal side of the carrier faces towards the outside.

20 Claims, 4 Drawing Sheets

(51) Int. Cl.
*E05D 3/12* (2006.01)
*E05D 15/40* (2006.01)

(52) U.S. Cl.
CPC ... *E05Y 2201/416* (2013.01); *E05Y 2201/474* (2013.01); *E05Y 2900/20* (2013.01)

(58) Field of Classification Search
CPC .... E05F 5/02; E05F 3/20; E05F 11/54; E05D 3/16; E05D 11/00; E05D 15/40; E05D 15/401; E05D 2003/163; E05D 3/06; E05D 3/12; E05Y 2201/10; E05Y 2201/256; E05Y 2201/21; E05Y 2201/264; E05Y 2201/47; E05Y 2201/492; E05Y 2201/416; E05Y 2201/474; E05Y 2900/20; E05Y 2900/202; E05Y 2600/10; E05Y 2600/41; A47B 2220/0072; Y10T 16/5383; Y10T 16/547; Y10T 16/5476; Y10T 16/5321; Y10T 16/5322; Y10T 16/53225
See application file for complete search history.

(56) References Cited

U.S. PATENT DOCUMENTS

| | | | |
|---|---|---|---|
| 7,500,287 B2 | 3/2009 | Brüstle | |
| 7,810,213 B2 | 10/2010 | Brüstle | |
| 9,175,703 B2 | 11/2015 | Maertens et al. | |
| 9,347,470 B2 | 5/2016 | Maertens et al. | |
| 9,695,856 B2 | 7/2017 | Maertens et al. | |
| 9,797,427 B2 | 10/2017 | Maertens et al. | |
| 10,161,432 B2 * | 12/2018 | Nitschmann | F16B 12/20 |
| 10,323,670 B2 | 6/2019 | Maertens et al. | |
| 10,448,739 B2 | 10/2019 | Derelov et al. | |
| 10,729,243 B2 * | 8/2020 | Carnelos | A47B 96/066 |
| 10,731,392 B2 * | 8/2020 | Salice | E05D 15/40 |
| 10,731,689 B2 | 8/2020 | Maertens et al. | |
| 10,935,063 B2 | 3/2021 | Maertens et al. | |
| 11,085,475 B2 | 8/2021 | Maertens et al. | |
| 11,246,415 B2 | 2/2022 | Derelov et al. | |
| 11,319,977 B2 | 5/2022 | Maertens et al. | |
| 2007/0124893 A1 | 6/2007 | Brustle | |
| 2009/0064457 A1 | 3/2009 | Brustle | |
| 2010/0129149 A1 | 5/2010 | Metz et al. | |
| 2010/0162847 A1 | 7/2010 | Gassner | |
| 2011/0280655 A1 | 11/2011 | Maertens et al. | |
| 2012/0027967 A1 | 2/2012 | Maertens et al. | |
| 2013/0026318 A1 | 1/2013 | Kashiwaguma | |
| 2014/0348580 A1 | 11/2014 | Maertens et al. | |
| 2015/0377269 A1 * | 12/2015 | Haemmerle | A47B 88/463 411/366.1 |
| 2016/0245322 A1 | 8/2016 | Maertens et al. | |
| 2017/0079433 A1 | 3/2017 | Derelov et al. | |
| 2017/0298971 A1 | 10/2017 | Maertens et al. | |
| 2017/0370392 A1 | 12/2017 | Maertens et al. | |
| 2019/0257338 A1 | 8/2019 | Maertens et al. | |
| 2020/0214447 A1 | 7/2020 | Derelov et al. | |
| 2020/0325923 A1 | 10/2020 | Maertens et al. | |
| 2021/0140458 A1 | 5/2021 | Maertens et al. | |
| 2021/0277924 A1 | 9/2021 | Maertens et al. | |

FOREIGN PATENT DOCUMENTS

| | | | |
|---|---|---|---|
| CN | 108026956 | | 5/2018 |
| DE | 3009380 A1 * | | 9/1981 |
| DE | 297 14 853 | | 11/1997 |
| DE | 20 2017 102 809 | | 9/2018 |
| EP | 2 078 811 | | 7/2009 |
| EP | 2 525 105 | | 11/2012 |
| EP | 2 551 432 | | 1/2013 |
| EP | 3 401 481 | | 11/2018 |
| JP | 11-132211 | | 5/1999 |
| JP | 2003-174937 | | 6/2003 |
| JP | 2003-230434 | | 8/2003 |
| JP | 2010-540801 | | 12/2010 |
| JP | 2017-12576 | | 1/2017 |
| WO | 2006/005086 | | 1/2006 |
| WO | WO-2013029070 A1 * | | 3/2013 ............ A47B 51/00 |

OTHER PUBLICATIONS

International Search Report dated Feb. 3, 2020 in International (PCT) Application No. PCT/AT2019/060385.

* cited by examiner

FURNITURE DRIVE

BACKGROUND OF THE INVENTION

The present invention relates to a furniture drive for moving a furniture part movably-supported relative to a furniture carcass. The furniture drive includes a carrier configured to be fixed within or to a sidewall of the furniture carcass, and the carrier has a front face and at least one longitudinal side protruding substantially at a right angle from the front face. A pivotally supported actuating arm is provided for moving the movable furniture part, and a fastening device is provided for fastening a furniture panel of the furniture carcass. The furniture panel extends substantially horizontally in a mounted position.

Moreover, the invention relates to an item of furniture comprising a furniture carcass, a furniture part movably-supported relative to the furniture carcass, and at least one furniture drive of the type to be described for moving the movable furniture part.

A furniture drive having a pivotally supported actuating arm for moving a furniture flap is described, for example, in WO 2006/005086 A1.

The carrier of such furniture drives is usually fixed to a sidewall of a furniture carcass. The actuating arm, in a mounted condition, is pivotally mounted about a horizontally extending axis on the carrier on the one hand and is configured to be connected to the furniture flap one the other hand, so that the furniture flap can be elevated from a vertical closed position about a horizontally extending pivoting axis relative to the furniture carcass. Tests of the applicant have shown that the kinematics of the furniture flap can be improved when the carrier is mounted to the sidewall of the furniture carcass on a position as high as possible. Usually, the maximum mounting height of the furniture drive on the sidewall is predetermined by the connecting region between the sidewall and the top panel of the furniture carcass. The connection between the sidewall and the top panel of the furniture carcass is usually established with the aid of screws, dowels and/or fins, whereby the maximum mounting height of the furniture drive is limited and the kinematics of the furniture drive can be negatively affected.

Furniture drives with a fastening device for fastening the carrier to a horizontally extending furniture panel are known, for example, from EP 2 078 811 A2 and EP 2 551 432 A2.

EP 3 401 481 A1 discloses a furniture drive for moving a furniture flap. A screw (FIG. 4) is arranged on a longitudinal side of the carrier, the screw being provided for fixing the furniture drive to a top panel of the furniture carcass. A drawback is the fact that the screw, in a mounted condition of the furniture drive, can only be accessed from the inside of the carrier, and that an actuation of the screw can be impeded by the components arranged within the interior of the carrier (pivoting arms, force storage member). In order to improve the accessibility of the screw, the screw is guided through an inclinedly aligned through hole of an angled element, so that the screw can be inclinedly screwed into the top panel of the furniture carcass.

SUMMARY OF THE INVENTION

It is an object of the present invention to propose a furniture drive of the type mentioned in the introductory part, thereby avoiding the above-discussed drawbacks.

According to the invention, the at least one fastening device includes at least one movably-supported locking element for fastening the furniture panel, and the locking element is configured to be accessible for a manual or for a tool-assisted actuation from a longitudinal side of the carrier, the longitudinal side facing towards the outside.

Accordingly, the furniture drive includes at least one fastening device for fastening a furniture panel extending horizontally in a mounted condition (preferably a top panel or a shelf of the furniture carcass), so that the connection between the sidewall and the horizontally extending furniture panel can be at least partially established by the furniture drive. In other words, the furniture drive also acts as a connecting member between the sidewall and the furniture panel, whereby the number of the fastening components between the sidewall and the furniture panel can be reduced. Eventually, the furniture drive can be fixed to the furniture carcass on a very high location, whereby the desired effect of the improved kinematics can also be afforded.

In addition to the movably-supported locking element, the at least one fastening device can include at least one opening for the passage of a fastening means, preferably a screw or a dowel, for fixing the furniture panel.

For example, the locking element can include at least one rotatably-supported eccentric-connector.

The locking element of the furniture drive is configured to be releasably lockable with a fastening means configured to be fixed to the furniture panel. Preferably, the fastening means is configured as a screw or as a dowel. In particular, the fastening means is configured to be fixed to a front face of the furniture panel.

The item of furniture according to the invention comprises a furniture carcass, a furniture part movably-supported relative to the furniture carcass, and at least one furniture drive of the described type for moving the movable furniture part. Preferably, the movable furniture part, in a mounted condition, is pivotally supported relative to the furniture carcass about an axis extending substantially in a horizontal direction. In a mounted condition, the item of furniture includes a sidewall extending substantially vertically and at least one furniture panel extending horizontally, and the carrier of the furniture drive is fixed within or to the sidewall, and the at least one fastening device of the furniture drive is connected to the furniture panel.

The carrier of the furniture drive can be at least partially received, preferably substantially entirely, within the sidewall of the furniture carcass, whereby a very compact and aesthetically unobtrusive arrangement of the furniture drive can be provided.

The carrier includes a front face and at least one longitudinal side protruding substantially at a right angle from the front face, and the at least one fastening device is accessible for a manual or for a tool-assisted actuation from a longitudinal side of the carrier, the longitudinal side of the carrier facing towards the outside.

BRIEF DESCRIPTION OF THE DRAWINGS

Further details and advantages of the present invention result from the following description of figures.

DETAILED DESCRIPTION OF THE INVENTION

Figure 1A:
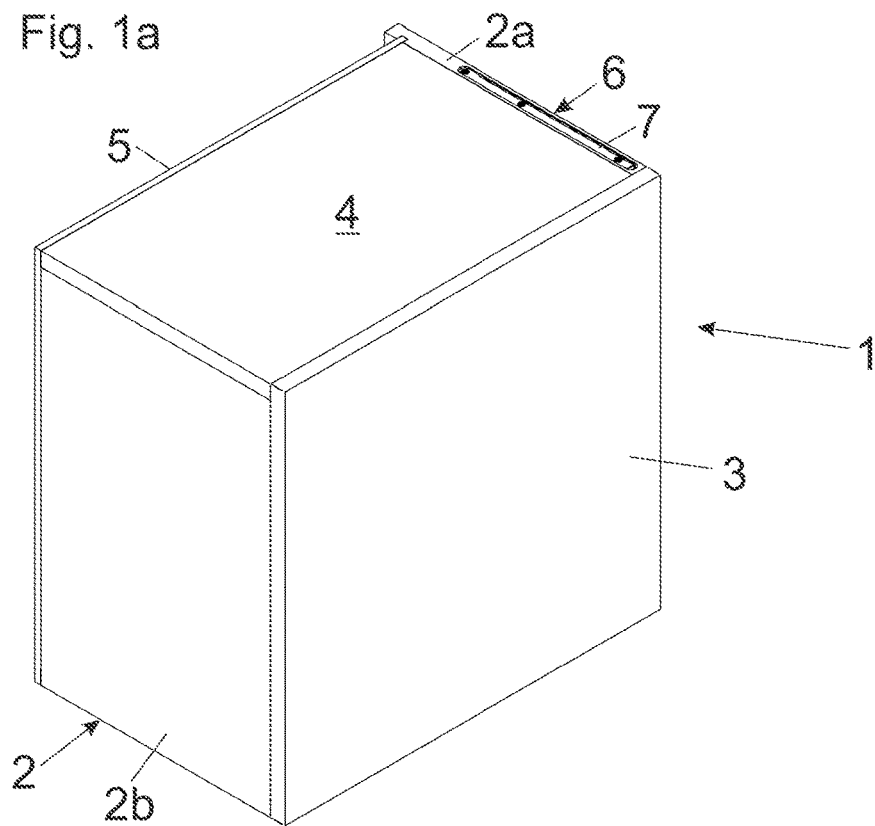
FIG. 1a, 1b show an item of furniture comprising a furniture carcass and a movable furniture part in a perspective view and in an exploded view.

FIG. 1a shows a perspective view of an item of furniture 1 comprising a furniture carcass 2 and a movable furniture part 3. The movable furniture part 3 can be moved by a furniture drive 6 relative to the furniture carcass 2 between a vertical closed position and an elevated open position. The furniture carcass 2 includes two opposing sidewalls 2a, 2b, a furniture panel 4 in the form of a top panel extending horizontally in a mounted condition, and a rear wall 5. The furniture drive 6 includes a carrier 7 configured to be fixed to or within the sidewall 2a. In the shown embodiment, the carrier 7 is substantially entirely received within the sidewall 2a.

Figure 1B:
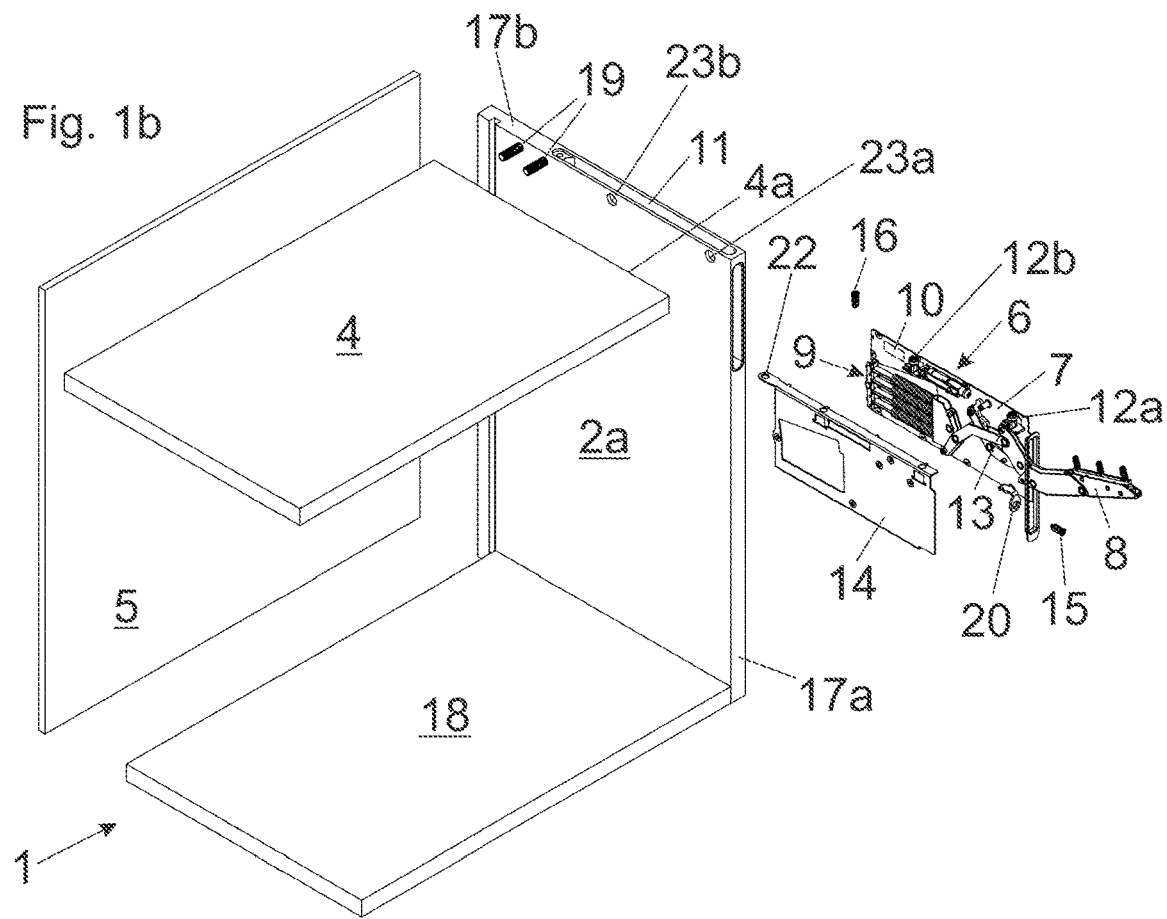

FIG. 1b shows the item of furniture 1 in an exploded view, in which the movable furniture part 3 and the sidewall 2b are not depicted for the sake of improved overview. The furniture carcass 2 includes the sidewalls 2a and 2b, a bottom panel 18, the horizontally aligned furniture panel 4 in the form of the top panel, and the rear wall 5. The furniture drive 6 for moving the movable furniture part 3 is configured to be at least partially, preferably substantially entirely, received within the sidewall 2a. For this purpose, the sidewall 2a includes a recess 11 which, in the shown embodiment, is configured to be open towards a front face 17a and/or towards an upper side 17b of the sidewall 2a. The furniture drive 6 includes a carrier 7, and at least one actuating arm 8 is pivotally supported on the carrier 7 about an axis 13 extending horizontally in a mounted condition. The furniture drive 6 can include at least one spring device 9 for applying a force to the at least one actuating arm 8 and/or at least one electric drive 10 for driving the at least one actuating arm 8.

The furniture drive 6 includes at least one fastening device 12a, 12b for fixing the horizontally extending furniture panel 4. The fastening device 12a, 12b can include at least one opening for the passage of a fastening means (fastener) 19, preferably a screw or a dowel, and/or at least one movably supported locking element 26 (FIG. 3a), for example a rotatably supported eccentric-connector, for fixing the furniture panel 4. Therefore, the furniture drive 6 also serves as a connecting member between the furniture panel 4 and the sidewall 2a in the mounted condition. The fastener 19 is configured to be releasably connected to the fastening device 12a, 12b of the furniture drive 6, and can be arranged on the front face 4a of the furniture panel 4 in the mounted condition.

The furniture drive 6 can include at least one second fastening device 20 configured to be fixed within or to the sidewall 2a of the furniture carcass 2. Preferably, the second fastening device 20 is configured as a bore for the passage of a further fastener 15, preferably of a screw.

In the shown figure, at least one mounting portion 14 separate from the carrier 7 is provided, the at least one mounting portion 14 having a third fastening device 22. The mounting portion 14 can be fixed within or to the sidewall 2a of the furniture carcass 2 by the third fastening device 22. In the simplest case, the third fastening device 22 can also be configured as a bore for the passage of a further fastener 16, preferably of a screw.

In order for the furniture panel 4 to be mounted, the two fasteners 19 are firstly pre-mounted to the furniture panel 4. Preferably, the fastener 19, in a mounted condition, laterally protrudes from the front face 4a of the furniture panel 4. In a subsequent mounting step, the mounting portion 14 is introduced from the upper side 17b of the sidewall 2a into the recess 11 of the sidewall 2a and is fixed to or within the sidewall 2a by the third fastening device 22. Subsequently, the carrier 7 is introduced from the front, that is to say from the front face 17a of the sidewall 2a, into the recess 11 of the sidewall 2a.

In a further mounting step, the fastener 19 pre-mounted to the furniture panel 4 (which can be two or more fasteners 19 as shown in FIG. 1b) is introduced into the two openings 23a, 23b of the sidewall 2a. A first fastener 19 is configured to be releasably connected to the front fastening device 12a, and a second fastener 19 is configured to be releasably connected to the rear fastening device 12b of the furniture drive 6, whereby the carrier 7 and the mounting portion 14 can be tensioned relative to one another within the recess 11 of the sidewall 2a.

Figure 2:
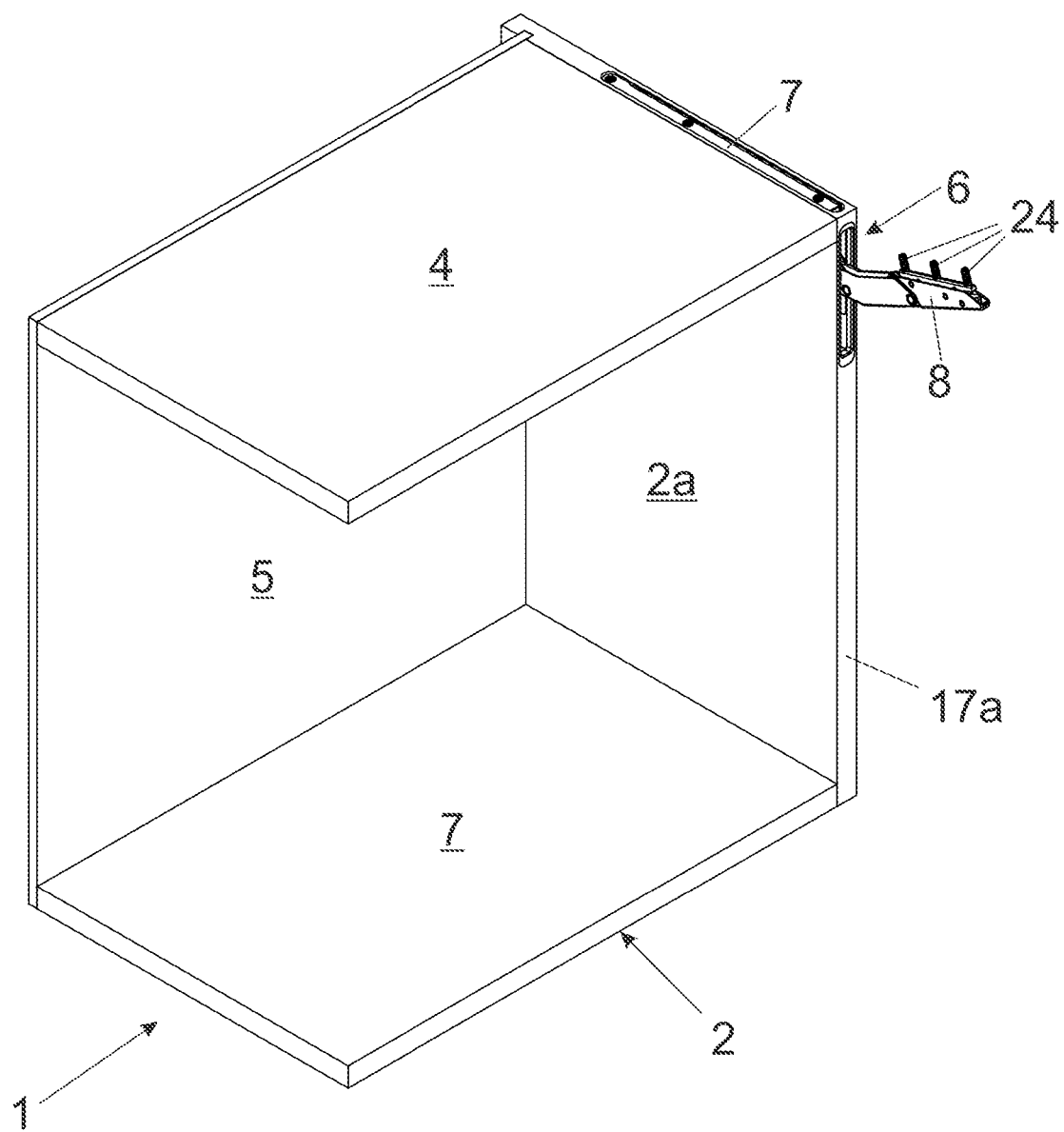
FIG. 2 shows the furniture drive fixed to the sidewall in a mounted condition.

FIG. 2 shows the item of furniture 1 with the furniture carcass 2 in a perspective view, in which the furniture drive 6 is received, for the most part, within the sidewall 2a of the furniture carcass 2. In a mounted condition, the furniture drive 6 can be covered on at least one side, preferably on both sides, by a top layer of the sidewall 2a, whereby a very compact and aesthetically unobtrusive arrangement of the furniture drive 6 can be provided. The recess 11 of the sidewall 2a of the furniture carcass 2 can either be configured as a blind hole or as a through hole.

A plurality of fasteners 24 are provided on the actuating arm 8, the fasteners 24 being configured to be fixed to the rear side of the movable furniture part 3. The movable furniture part 3 is pivotally mounted to the underside of the furniture panel 4 by conventional furniture hinges and can be moved relative to the furniture carcass 2 between a vertical closed position and an elevated open position by the actuating arm 8 of the furniture drive 6. The actuating arm 8 of the furniture drive 6 is pivotally supported between a fully closed position and a fully open position, and the actuating arm 8, in the fully closed position, is at least partially, preferably substantially entirely, received within the sidewall 2a of the furniture carcass 2.

In this connection, it can be advantageous when at least one fastener 24 of the actuating arm 8, as commonly known, is releasably lockable to a fitting body (not shown) to be fixed to the movable furniture part 3. When the actuating arm 8 of the furniture drive 6 is at least partially countersunk within the recess 11 of the sidewall 2a, it is advantageous when the actuating arm 8 is releasably locked in its closed position. Then, the fitting body of the movable furniture part 3, in the closed position of the actuating arm 8, is automatically lockable with the actuating arm 8 by manually pressing the movable furniture part 3 in a direction of the front face 17a of the sidewall 2a of the furniture carcass 2.

Figure 3A:
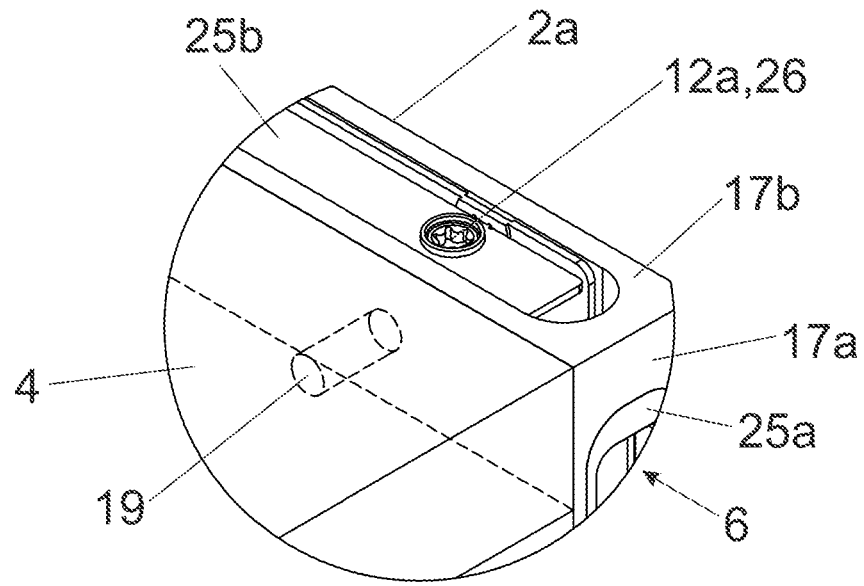
FIG. 3a, 3b show the connecting region between the furniture panel and the sidewall in two different views.

FIG. 3a shows a connecting region between the horizontally extending furniture panel 4 and the sidewall 2a in a detail view. The fastener 19 to be arranged on the furniture panel 4 is depicted with a dashed line. The carrier 7 includes a front face 25a and at least one longitudinal side face 25b protruding substantially at a right angle from the front face 25a, and the at least one fastening device 12a, 12b is freely accessible for a manual or for a tool-assisted actuation from the longitudinal side face 25b facing towards the outside of the sidewall 2a. The fastening device 12a, 12b includes at least one movably-supported locking element 26 for releasably locking the fastening element 19. The locking element 26 can be rotatably supported and can include a tool-receiving device, and the locking element 26 can be rotated by rotating the tool-receiving device with the aid of a tool. In this way, the locking element 26 can be releasably locked with the fastener 19. The locking element 26, in a mounted condition, is freely accessible for an actuation from the upper side 17b of the sidewall 2a, that is to say from the longitudinal side 25b of the carrier 7, in order to mount and to demount the furniture panel 4. In other words, as shown in FIGS. 3a and 3b, the fastening device 12a (and particularly the locking element 26 of the fastening device 12a) is on the outwardly-facing longitudinal side face 25b of the carrier 7 so as to face outwardly with respect to an interior of both the sidewall 2a and the item of furniture 1 so as to be accessible from outside the sidewall 2a and the item of furniture 1 without disassembly of the item of furniture 1 or the sidewall 2a.

Figure 3B:
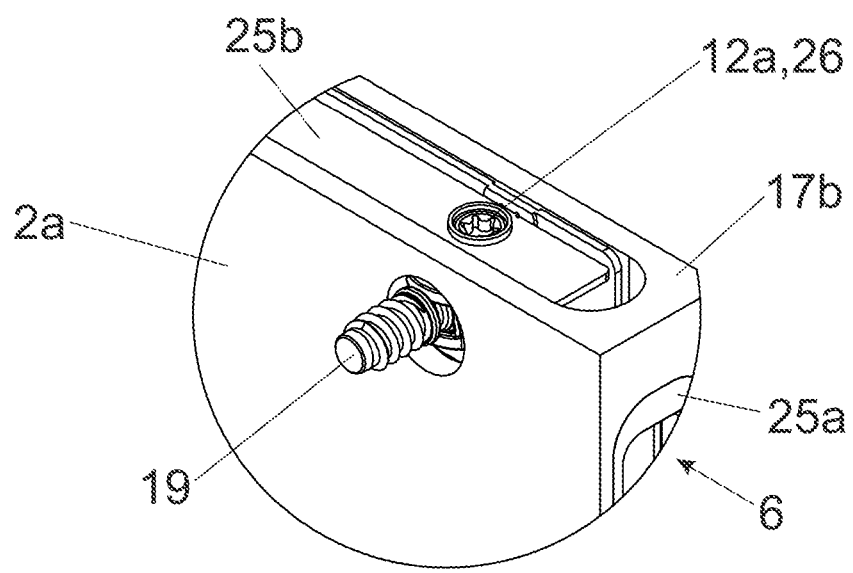

FIG. 3b shows the connecting region according to FIG. 3a, in which the furniture panel 4 is not depicted. The fastener 19 to be mounted to the furniture panel 4 includes a threaded portion configured to be screwed into the front face 4a (FIG. 1b) of furniture panel 4 on the one hand, and is configured to be releasably locked with the locking element 26 of the fastening device 12a, 12b on the other hand.

Figure 4A:
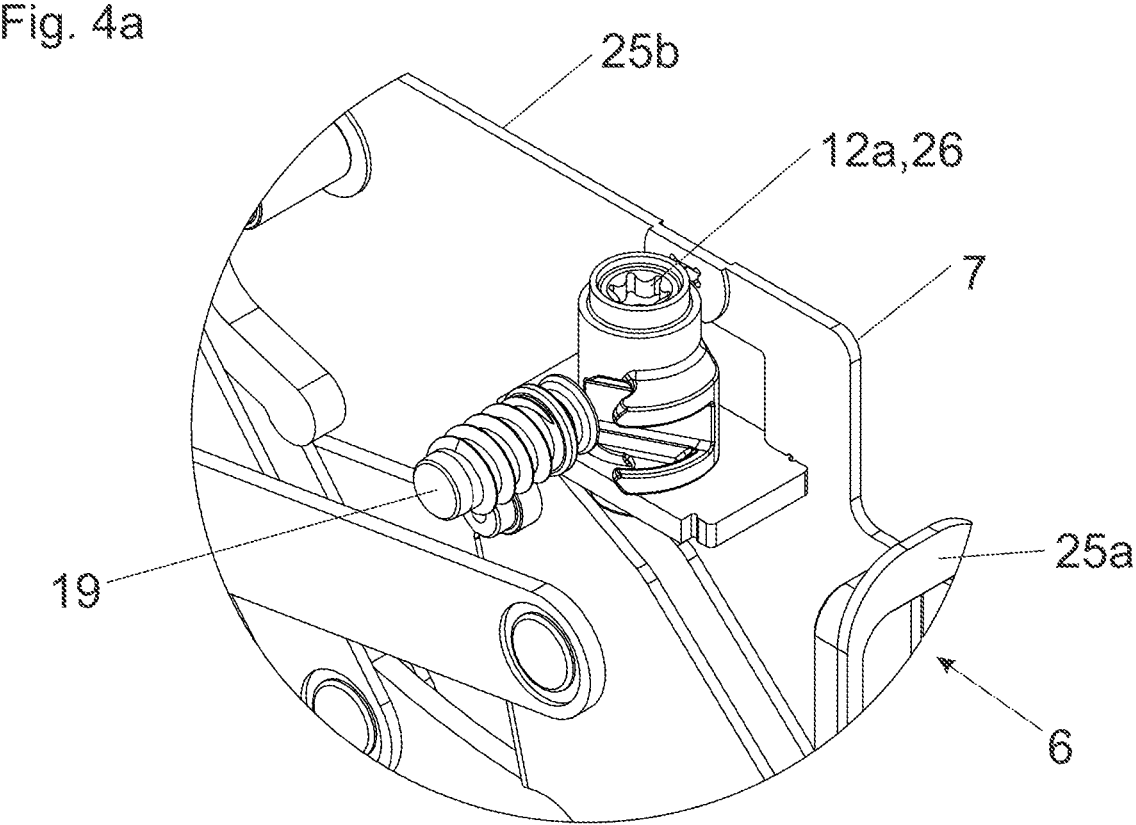
FIG. 4a, 4b show a possible embodiment of a furniture drive comprising a pivotally supported locking element in a release position and in a tensioned position.
Figure 4B:
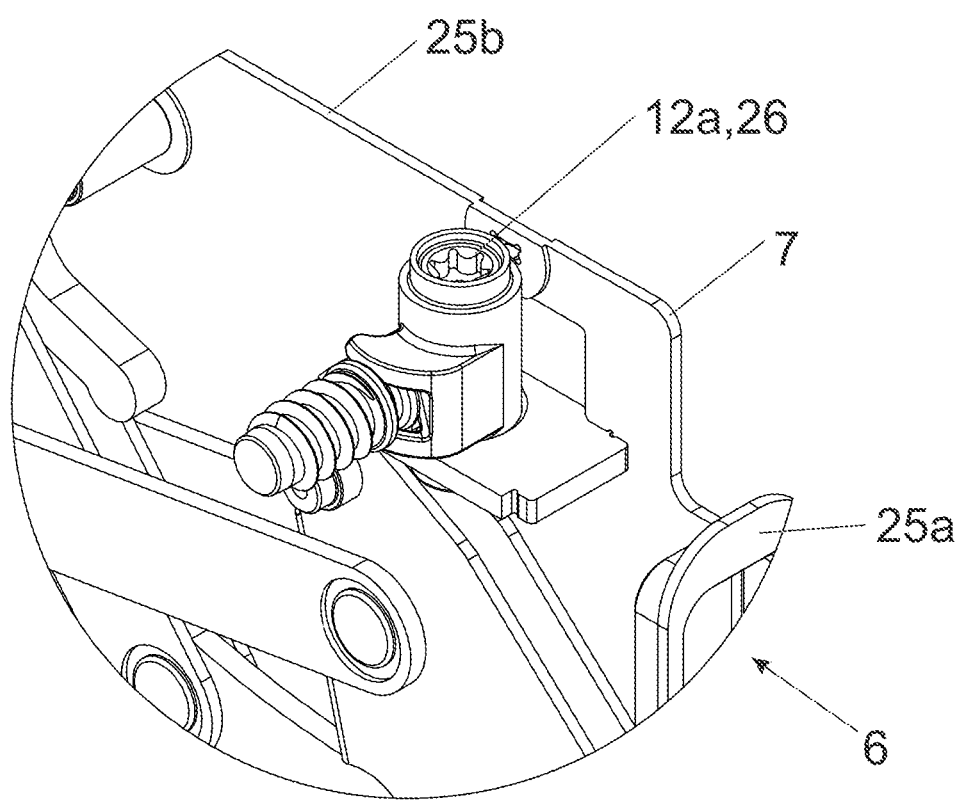

FIG. 4a shows a partial region of the furniture drive 6 with the fastening device 12a for releasably connecting the furniture panel 4 which is not shown here. The fastener 19 pre-mounted to the furniture panel 4 can be releasably locked to the locking element 26 of the fastening device 12a. In FIG. 4a, the locking element 26 is located in a release position. By rotating the locking element 26 with the aid of a tool, preferably with a screwdriver, the fastener 19 is pulled in a direction of the locking element 26, whereby the furniture panel 4 is pressed onto the sidewall 2a of the furniture carcass 2. The tensioned position of the locking element 26 is shown in FIG. 4b. The locking element 26 of the fastening device 12a may include at least one eccentric connector known in the prior art, for example as shown in DE 297 14 853 U1. Such eccentric connectors usually have a two-part configuration and include a fastener 19 in the form of a bolt and rotatable metal cylinder separate from the bolt. The metal cylinder includes an eccentrically-shaped guide surface configured to engage behind a head of the fastener 19 in the form of the bolt. By rotating the metal cylinder with the aid of a tool, the head of the fastener 19 is guided along the eccentrically-shaped guide surface of the metal cylinder, whereby the fastener 19 (and therewith the furniture panel 4) can be pulled against the sidewall 2a.

The embodiment of the furniture drive 6 according to FIG. 1b includes two fastening devices 12a, 12b separate from one another for fixing the furniture panel 4. The fastening devices 12a, 12b are spaced from one another along the longitudinal side 25b of the carrier 7, and are each freely accessible in a mounted condition of the furniture drive 6 for an actuation by a user.

The invention claimed is:

1. A furniture drive for moving a furniture part movably-supported relative to a furniture carcass, the furniture drive comprising:
a carrier configured to be fixed within or to a sidewall of the furniture carcass, the carrier having a front face and a longitudinal side face protruding substantially at a right angle from the front face;
a pivotally supported actuating arm for moving the movable furniture part; and
a fastening device for fastening a furniture panel of the furniture carcass to the furniture drive, the furniture panel extending substantially horizontally in a mounted position,
wherein the fastening device includes a movably-supported locking element for fastening the furniture panel to the carrier, and the locking element is configured to be accessible for a manual or for a tool-assisted actuation from the longitudinal side face of the carrier facing outwardly with respect to an interior of the carrier and with respect to an interior of the sidewall in a mounted condition of the furniture drive.

2. The furniture drive according to claim 1, further comprising:
a spring device for applying a force to the actuating arm; and/or
an electric drive for driving the actuating arm.

3. The furniture drive according to claim 1, wherein the fastening device includes an opening for the passage of a fastener for fixing the furniture panel to the furniture drive.

4. The furniture drive according to claim 3, wherein the fastener is a screw or a dowel.

5. The furniture drive according to claim 1, wherein the locking element includes a rotatably-supported eccentric connector.

6. The furniture drive according to claim 1, wherein the locking element of the furniture drive is configured to be releasably locked with a fastener configured to be fixed to the furniture panel.

7. The furniture drive according to claim 6, wherein the fastener is a screw or a dowel to be fixed to a front face of the furniture panel.

8. The furniture drive according to claim 1, wherein the fastening device is a first fastening device, the furniture drive further comprising a second fastening device to be fixed within or to the sidewall of the furniture carcass.

9. The furniture drive according to claim 8, wherein the second fastening device is a bore for the passage of a fastener in the form of a screw.

10. The furniture drive according to claim 1, further comprising a mounting portion separate from the carrier, the mounting portion having a mounting portion fastening device, and the mounting portion is to be fixed within or to the sidewall of the furniture carcass by the mounting portion fastening device.

11. An item of furniture comprising:
a furniture carcass having a sidewall and a furniture panel;
a movable furniture part movably-supported relative to the furniture carcass; and
a furniture drive for moving the movable furniture part, the furniture drive including:
a carrier fixed within or to the sidewall of the furniture carcass, the carrier having a front face and a longitudinal side face protruding substantially at a right angle from the front face;
a pivotally supported actuating arm for moving the movable furniture part; and
a fastening device for fastening the furniture panel of the furniture carcass to the furniture drive, the furniture panel extending substantially horizontally in a mounted position,
wherein the fastening device includes a movably-supported locking element for fastening the furniture panel to the carrier, and the locking element is configured to be accessible for a manual or for a tool-assisted actuation from the longitudinal side face of the carrier facing outwardly with respect to an interior of the carrier and with respect to an interior of the sidewall in a mounted condition of the furniture drive.

12. The item of furniture according to claim 11, wherein the fastening device of the furniture drive is connected to the furniture panel.

13. The item of furniture according to claim 11, wherein the carrier of the furniture drive is at least partially received within the sidewall of the furniture carcass.

14. The item of furniture according to claim 13, wherein the carrier of the furniture drive is entirely received within the sidewall of the furniture carcass.

15. The item of furniture according to claim 11, wherein the furniture drive is arranged in an uppermost region of the sidewall.

16. The item of furniture according to claim 11, wherein the fastening device is arranged in a region of the longitudinal side face of the carrier.

17. The item of furniture according to claim 11, wherein the furniture drive is received substantially entirely within a recess of the sidewall.

18. The item of furniture according to claim 17, wherein the recess of the sidewall is open towards a front face of the sidewall and/or towards an upper side face of the sidewall.

19. The item of furniture according to claim 11, wherein the actuating arm of the furniture drive is pivotally supported between a fully closed position and a fully open position, and the actuating arm, in the fully closed position, is at least partially received within the sidewall of the furniture carcass.

20. The furniture drive according to claim 11, wherein the movable furniture part is pivotally supported relative to the furniture carcass about a pivoting axis extending substantially horizontally in a mounted condition of the movable furniture part.

* * * * *